J. H. BOEHME & G. E. HOLDEN.
CORN PLANTER.
APPLICATION FILED JULY 15, 1912.

1,089,458.

Patented Mar. 10, 1914.

Witnesses:
John Enders
M. F. Coughlin

Inventors:
John H. Boehme
George E. Holden,
by Clarence J. Loftus
Atty.

UNITED STATES PATENT OFFICE.

JOHN H. BOEHME, OF HORNICK, AND GEORGE E. HOLDEN, OF CASTANA, IOWA.

CORN-PLANTER.

1,089,458.    Specification of Letters Patent.   Patented Mar. 10, 1914.

Application filed July 15, 1912. Serial No. 709,574.

*To all whom it may concern:*

Be it known that we, JOHN H. BOEHME, residing at Hornick, in the county of Woodbury and State of Iowa, and GEORGE E.
HOLDEN, residing at Castana, in the county of Monona and State of Iowa, both citizens of the United States, have invented a new and useful Improvement in Corn-Planters, of which the following is a specification.
The object of our invention is to provide a simple, durable, inexpensive and efficient means for operating the drop mechanism in corn planters and the like.

The above and other objects, advantages and capabilities of our invention will become apparent from a detailed description of the accompanying drawing in which—

Figure 1:
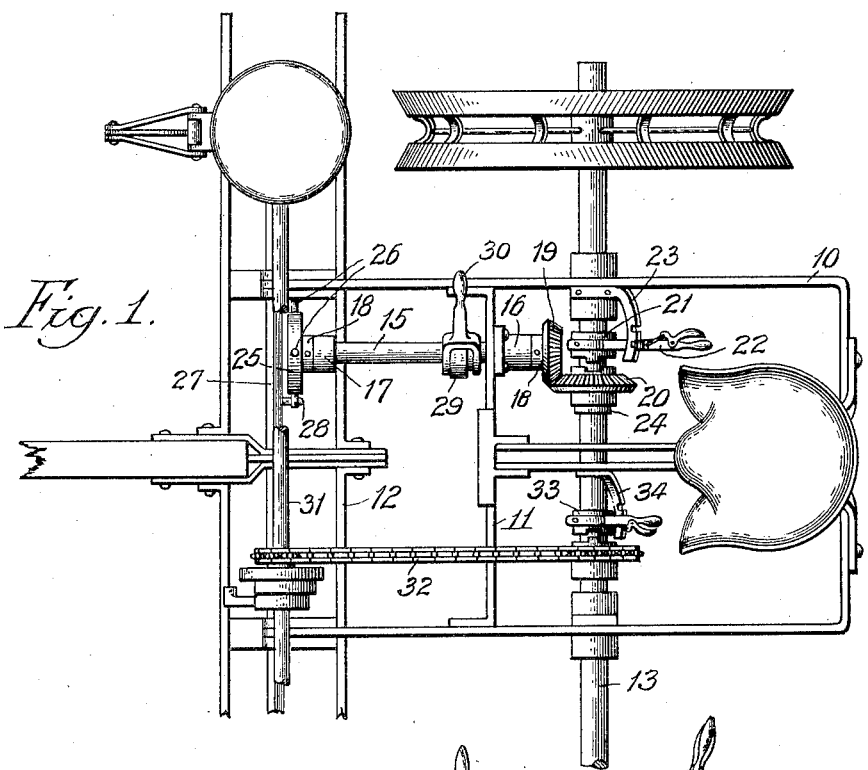
Figure 2:
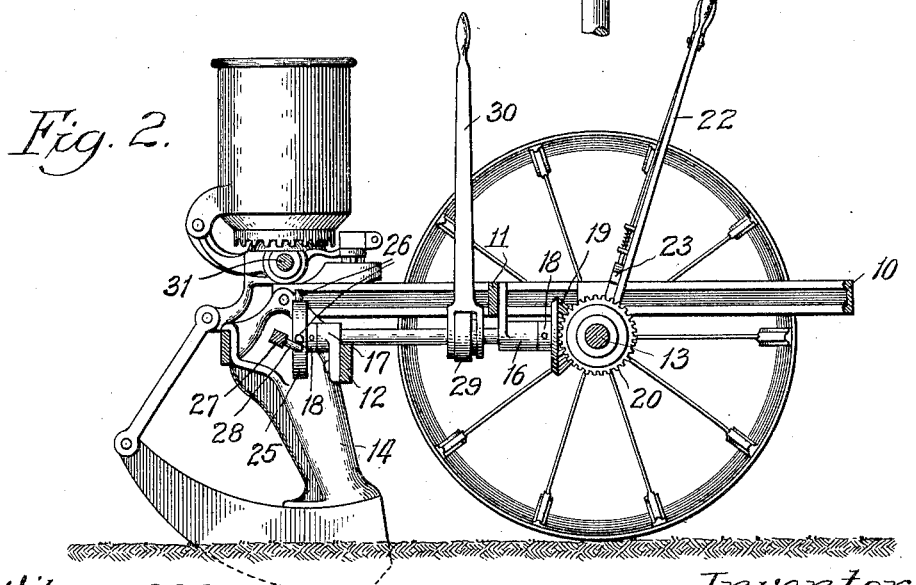

Figure 1 is a plan view of a corn planter showing our invention applied thereto and having a portion of the planter broken away, and Fig. 2 is a longitudinal central sectional view of the same.

We have shown herein a suitable corn planter with a portion of the same broken away and having our invention applied thereto. The corn planter proper, however, forms no part of our invention.

Our device is designed to be applied to corn planters and the like having suitable drop mechanism, and our invention consists of means adapted to actuate said drop mechanism, said means connecting with the axle of the planter.

Our invention consists, generally stated, in a longitudinal shaft rotatably mounted in the frame of a suitable corn planter and provided at its rear end with a beveled pinion designed to be operatively engaged by a beveled gear wheel mounted on the axle.
Said longitudinal shaft being provided at its forward end with a suitable wheel having a series of lugs projecting from its periphery and designed to engage a suitable lug on a transverse shaft, the said transverse shaft rotatably mounted in the frame of the corn planter and being operatively connected with the drop mechanism in the heels of the planter.

Referring to the accompanying drawing in detail we have used the numeral 10 to designate the body portion of the frame of the corn planter, which frame is provided with suitable cross braces, 11 and 12. The frame is mounted near its rear end in any suitable manner on the axle 13 and at its forward end on the heels of the furrow openers, 14. The axle 13 is designed to rotate with the wheels as the planter is drawn across the field. The longitudinal shaft 15 is rotatably mounted in the journals 16 and 17, which journals are secured to the cross braces 11 and 12 by any suitable means such as the bolts shown. The shaft, 15, is provided near each end with a collar, 18, designed to engage the journals 16 and 17 to prevent endwise movement of said shaft. Securely mounted on the rear end of such shaft is a beveled pinion, 19, which is adapted to be engaged by a beveled gear wheel, 20, on the axle 13. The said beveled gear wheel, 20, is loosely mounted on the axle 13, but is adapted to rotate with said axle when thrown into engagement by means of the clutch 21. For throwing the clutch 21 into and out of engagement with the beveled gear wheel 20 we provide the lever 22, which is connected at its lower end with the collar 21 by any suitable means and is provided at its upper end with the usual engaging means designed to engage the sector, 23. When the handle is in the position shown in Fig. 1 the gear wheel 20 is out of operative connection with the axle 13 and does not rotate with said axle and the shaft 15 necessarily would be out of operative connection with the planter.

For operatively connecting said mechanism with the axle all that is necessary is to throw the lever over until the clutch engages the gear wheel 20. The said gear wheel 20 is held against transverse displacement on the axle 13 by means of a collar, 24, and the beveled pinion 19. Securely mounted on the forward end of the longitudinal shaft 15 is a wheel, 25, which is provided on its periphery with a series of lugs, 26, spaced apart at equal distance for a purpose presently to be described.

The rod or shaft 27 extends transversely across the frame work, the ends of which enter the heels of the planter and are adapted to be connected to suitable drop mechanism.

Secured to the shaft 27 is a lug, 28, adapted to be engaged by the lugs 26 on the wheel 25. The lug 28 engages the lugs 26 sufficiently to cause the shaft 27 to partially rotate before disengaging with the lugs 26. After the lug 27 is disengaged from one of the lugs 26 it returns to its normal position by means of a suitable spring not shown, and is then engaged by the next lug 26 and the shaft 27 is again partially rotated. The distance between the lugs 26 on the periphery of the wheel, 25, may be any desired distance depending upon the distance between the hills of the seed planted.

For adjusting the means for actuating the drop mechanism we have provided the longitudinal shaft 15 with a ratchet 29 which is actuated by a lever 30 said lever being provided with a pawl designed to engage said ratchet. To adjust said mechanism all that is necessary is to throw the gear wheel 20 out of engagement or operative connection with the axle 13 and then rotate the shaft by means of the lever 30 until the lugs 26 on the wheel 25 are in the proper position.

The planter here shown is of the type having a continuous rotating drop plate, as before stated, which continuous rotation is produced by means of the transverse shaft 31, which is operatively connected at each end with the drop plates in the seed box and has securely mounted thereon at a suitable point a sprocket wheel which is connected with the sprocket wheel on the axle by means of a sprocket chain, 32. The said sprocket wheel on the axle 13 is thrown into and out of operative connection with the axle 13 by means of the clutch 33. And for throwing the said clutch into and out of engagement with the said sprocket wheel we have provided a suitable lever which is connected at its lower end to the said clutch and is provided near its upper end with the usual engaging means designed to engage a suitable sector, 34.

While we have herein shown and described only one specific embodiment of our invention, it is to be understood that various changes may be resorted to by those skilled in the art without departing from the scope of our invention as defined in the appended claims.

Having thus described our invention, what we claim as new and desire to secure by Letters Patent of the United States, is:

1. In a device of the class described, a corn planter having an axle and furrow openers, a frame mounted on said axle and furrow openers, a transverse oscillating shaft mounted on said frame and adapted to be connected at either end with a suitable drop mechanism, a lug on said transverse shaft, a longitudinal shaft rotatably mounted on said frame and provided with a wheel or disk at one end having lugs spaced apart on its periphery, said lugs being designed to operatively engage the lug on said transverse shaft for partially oscillating said shaft, and means for rotating said longitudinal shaft.

2. In a device of the class described, the combination of a planter comprising an axle and furrow openers having a frame mounted theron, a transverse shaft mounted on said frame and adapted to be connected at either end with suitable drop mechanism in said furrow openers, a lug on said transverse shaft, a longitudinal shaft rotatably mounted on said frame and provided with a wheel or disk having a series of lugs spaced apart on its periphery designed to operatively engage the lug of said transverse shaft, a pinion securely mounted on the opposite end of said shaft, a gear wheel mounted on said axle and adapted to mesh with said pinion, means for throwing said pinion into, and out of operative connection with the gear wheel on said axle, and a ratchet lever for rotating said longitudinal shaft when out of operative connection with said axle, substantially as, and for the purpose described.

In witness whereof, we hereunto subscribe our names this 29 day of June A. D. 1912.

JOHN H. BOEHME.
GEORGE E. HOLDEN.

Witnesses:
J. M. HATHAWAY,
W. H. FOSTER.

---

Copies of this patent may be obtained for five cents each, by addressing the "Commissioner of Patents, Washington, D. C."